United States Patent [19]

Kawai et al.

[11] Patent Number: 5,811,032
[45] Date of Patent: Sep. 22, 1998

[54] BIODEGRADABLE WATER-SOLUBLE POLYMER

[75] Inventors: Ryozo Kawai; Hiroshi Kurata; Yukari Shimizu, all of Ibaraki; Shoichiro Kajiwara, Kanagawa, all of Japan

[73] Assignee: Mitsubishi Gas Chemical Company, Inc., Tokyo, Japan

[21] Appl. No.: 716,606

[22] Filed: Sep. 19, 1996

[30] Foreign Application Priority Data

Sep. 19, 1995 [JP] Japan .................................. 7-239875

[51] Int. Cl.⁶ .............................. C09K 3/00; C23F 11/00; C08G 63/91
[52] U.S. Cl. ........................ 252/396; 525/418; 525/419; 525/420; 525/175; 525/392; 525/394; 525/396; 525/397; 528/271; 528/292; 528/363; 252/175; 252/392; 252/394; 252/396; 252/397
[58] Field of Search ..................... 525/418, 419, 525/420, 175, 392, 394, 396, 397; 528/271, 292, 363; 252/175, 392, 394, 396, 397

[56] References Cited

U.S. PATENT DOCUMENTS

| | | | |
|---|---|---|---|
| 4,696,981 | 9/1987 | Harada et al. ........................ | 525/328.2 |
| 5,442,038 | 8/1995 | Wood et al. .............................. | 528/363 |
| 5,521,279 | 5/1996 | Wood et al. .............................. | 528/363 |
| 5,552,518 | 9/1996 | Wood et al. .............................. | 528/363 |

FOREIGN PATENT DOCUMENTS

| | | |
|---|---|---|
| 0 593 187 A1 | 10/1993 | European Pat. Off. . |
| WO 95/09881 | 4/1995 | WIPO . |

OTHER PUBLICATIONS

European Search Report.

*Primary Examiner*—Samuel A. Acquah
*Attorney, Agent, or Firm*—Sughrue, Mion, Zinn, Macpeak & Seas, PLLC

[57] ABSTRACT

A water-soluble polymer prepared by melting and reacting a mixture of an oxycarboxylic acid having a melting point of 170° C. or less and maleamic acid, or a mixture of a plurality of oxycarboxylic acids including at least one oxycarboxylic acid having a melting point of 170° C. or less and maleamic acid, at a temperature of 170° C. or less at the start of the reaction to obtain a polymer; and then hydrolyzing the polymer.

14 Claims, No Drawings

BIODEGRADABLE WATER-SOLUBLE POLYMER

FIELD OF THE INVENTION

The present invention relates to a biodegradable water-soluble polymer. In more detail, the present invention relates to a scaling inhibitor that is advantageously used in a cooling water system, a process for making fresh water from sea water and a process for desalting salt water.

BACKGROUND OF THE INVENTION

In each of a cooling water system, a process for making fresh water from sea water and a process for desalting salt water, a scale, such as a calcium carbonate scale, a calcium sulfate scale, a magnesium hydroxide scale and a calcium silicate scale, is deposited on a heat transfer surface when water is condensed by concentration of hard components contained in the system or by a change in pH.

A scale inhibitor is generally used to prevent scale. Recently, synthetic polymers, such as maleic acid series polymers and acrylic acid series polymers have mainly been used. These scale inhibitors when added in a small amount to the objective water system can greatly decrease the adhesion of scale. That is, almost all scale formation can be inhibited, for example, by adding only 10 ppm of the scale inhibitor to a system containing 500 ppm of a calcium compound. Thus, such conventional synthetic polymers satisfactorily inhibit scale formation. However, other problems are encountered due to the continued presence of the scale inhibitor once its primary function has been achieved. Generally, it is difficult to degrade or deteriorate synthetic polymer molecules by the action of microorganisms, and there is a need to develop biodegradable polymers due to the increasing importance of environmental conservation. In the case of a water-soluble polymer, separation and recovery after achieving the objective is difficult, thus resulting in a serious problem. This also applies to the use of water-soluble polymers as scale inhibitors. Conventional maleic acid series and acrylic acid series synthetic polymers have very low biodegradability. Thus, there is a great demand for development of a polymer having both the scale inhibitory properties of the synthetic polymers and the high biodegradability like conventional low molecular weight substances.

Various proposals have been made to impart biodegradability to a polymer having a scale inhibitory property, or to develop new compounds having the desired properties. These proposals may be classified as follows:

(1) The first is a method of obtaining a highly biodegradable polymer in which cellulose or starch, etc., is chemically modified to impart thereto solubility or scale inhibitory properties.

(2) A second is a method of imparting biodegradability to acrylic acid series and maleic acid series polymers by incorporating a biodegradable moiety into the main chain thereof, by grafting thereon a biodegradable polymer chain, or by controlling the molecular weight and molecular weight distribution of the polymer.

(3) A third is a method of developing a high performance aliphatic polyester compound.

(4) A fourth is a method of developing high performance polyamino acids.

However, a problem with method (1) is that the biodegradability decreases as the degree of chemical modification increases, even though the new function is expressed more effectively.

Furthermore, a problem with method (2) is that the original scale inhibitory property decreases as the biodegradability is improved.

Therefore, it is considered that an essential solution is the development of a new compound which has the same scale inhibitory properties as a conventional scale inhibitor and which also exhibits good biodegradability.

The use of polyamino acids, such as polyglutamic acid or polyaspartic acid, has been proposed. These polyamino acids can be used safely and have high biodegradability, as identified in the field of polymers for medical use, such as a DDS (drug delivery system). Also, the scale inhibitory property is noted in *Natl. Counc. Res. Dev., NCRD (Isr.)*, 150–157 (1977), and the crystallization inhibitory property is noted in *J. Cryst. Growth*, Vol. 57, No. 2, 336–342 (1982). Especially, those properties of polyaspartic acid not found in conventional scale inhibitors have been studied.

However, polyamino acids, such as polyaspartic acid, etc., have not been industrially used as scale inhibitors. This is because an inexpensive and practical method of preparing these compounds has not yet been developed. Methods for preparing polyaspartic acid have been studied for quite some time, and the most general of these is a condensation polymerization of aspartic acid monomer. This method is disadvantageous in that techniques other than solid-phase polymerization are difficult to adopt and the polymerization reaction time is very long. This is because the raw materials and products of this method have a high melting point. This method is further disadvantageous in that the aspartic acid monomer of a raw material is expensive.

As for other methods, there is a method in which maleamic acid is used as a raw material. Maleamic acid is easily produced from maleic acid anhydride and ammonia and is therefore inexpensive. Thus, this method is attractive in view of the raw material cost. Nevertheless, even though maleamic acid has a relatively low melting point, this method has not been industrially practiced because the melting point of the product is high and the decomposition point of maleamic acid is lower than the melting point.

On the other hand, it is well known that an aliphatic polyester compound is biodegradable. Thus, if this structure is modified to impart other functions, several possibilities may be considered. For example, if there is an ester bond in the main chain, and appropriate functional groups are introduced into the side chains, and the molecular weight distribution is properly controlled, then there is a good possibility that the resulting polymer is biodegradable and also exhibits additional functions.

Polymalic acid is attractive in these respects. The properties of polymalic acid have been studied for various applications, and inexpensive methods for producing the same have been proposed.

The least expensive is considered to be a method in which malic acid monomer is directly condensation-polymerized. However, the polymer obtained by this method has a low degree of polymerization and a weight-average molecular weight of 1,000 to 1,500 at most as disclosed in *Kobunshi Ronbunsyu*, Vol. 44, No. 9, 701–709. Also, the condition that the method produces a polymer which can express additional useful functions has not been satisfied.

Regarding other oxycarboxylic acids, far less knowledge has been accumulated than in the case of malic acid.

As described above, polyamino acids and aliphatic polyesters have been proposed as polymers which are both biodegradable and exhibit other functions. Also, such systems are considered to afford the easiest approach, and several attempts in this regard have been made. However, where mass production is required, for example, in the production of a scale inhibitor, a practical preparation method hitherto has not been developed.

Several proposals have been made regarding the polymerization of a mixture of maleamic acid and other compounds. U.S. Pat. No. 4,590,260, unexamined published Japanese Patent Application No. Sho 61-218634 and U.S. Pat. No. 4,696,981 disclose a method for obtaining a co-polyamino acid from a mixture of maleamic acid and the ammonium salt of malic acid or an amide derivative thereof. This product is considered to be useful as a cosmetic base, a special adhesive, a skin coating, etc. Also, a co-polymer of an amino acid is proposed. Although it is unclear that the entire polymer structure must be in a state such that the amino acids are bonded, the above patent publications specify a co-polymer of amino acids.

Thus, malic acid itself is not used. Rather, an ammonium salt of malic acid or an amide derivative thereof is used as a raw material. Also, a microwave is used to promote the reaction, and the reaction must be conducted at a high temperature of 190° C. or more from its initial stage. However, the yield rarely exceeds 50%.

Furthermore, it is considered that a polymer can be obtained, even if a mixture of a water-soluble polymer which itself has a low melting point and maleamic acid is heated at a temperature that is lower than the melting point of the maleamic acid. However, in this method, the polymer having a low melting point only becomes a diluent having no function after the reaction. Thus, this method cannot be used effectively.

SUMMARY OF THE INVENTION

The present inventors synthesized various polymers having an amide bond or an ester bond in a main chain thereof and a functional group in a side chain thereof, and have extensively studied these polymers with the view of solving the above-noted problems of the prior art. In the course of these studies, the present inventors discovered an unexpected phenomena, and achieved the present invention based on the above-noted findings.

That is, the present invention provides a water-soluble polymer and a preparation method thereof, which polymer is prepared by:

melting and reacting a mixture of an oxycarboxylic acid having a melting point of 170° C. or less and maleamic acid, or a mixture of a plurality of oxycarboxylic acids including at least one oxycarboxylic acid having a melting point of 170° C. or less and maleamic acid, at a temperature of 170° C. or less at the start of the reaction to obtain a polymer; and then hydrolyzing the polymer.

In a preferred embodiment, the oxycarboxylic acid having a melting point of 170° C. or less is selected from the group consisting of malic acid, citric acid and tartaric acid. The weight ratio of the oxycarboxylic acid to the maleamic acid in the reaction system is preferably in the range of from 5/95 (wt/wt) to 90/10 (wt/wt).

The present invention further provides a method for preventing scale formation wherein the polymer of the present invention is used in a cooling water system, or in a process for making fresh water from sea water, or in a process for desalting salt water.

Preferably, the polymer is a random co-polymer having a weight-average molecular weight of from 2,000 to 20,000 and comprising a structural unit selected from those represented by formulae I, II, III and IV:

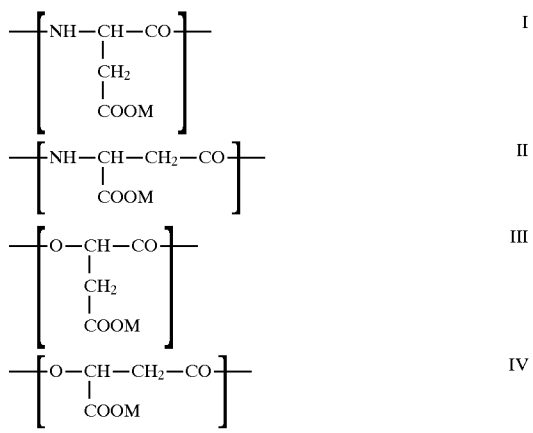

where M is H, Na, K or $NH_4$.

The present invention further provides a method for preparing a water-soluble polymer in a polymerization reaction which comprises melting and reacting a mixture of an oxycarboxylic acid having a melting point of 170° C. or less and maleamic acid, or a mixture of a plurality of oxycarboxylic acids including at least one oxycarboxylic acid having a melting point of 170° C. or less and maleamic acid, at a temperature of 170° C. or less at the start of the reaction to obtain a polymer; and then hydrolyzing the polymer. The oxycarboxylic acid for use in the present method is preferably selected from the group consisting of malic acid, citric acid and tartaric acid. The weight ratio of the oxycarboxylic acid to the maleamic acid is preferably in the range of from 5/95 (wt/wt) to 90/10 (wt/wt).

The present invention is quite different from conventional methods for the following reasons:

(1) The present method can be conducted at a milder condition than the polymerization of maleamic acid alone. Also, a polymer having a high degree of polymerization is easily obtained in high yield.

(2) The oxycarboxylic acid contributes to the mild reaction conditions because it has a melting point that is lower than that of maleamic acid, and the oxycarboxylic acid itself is polymerized. It is not possible to obtain this high degree of polymerization using oxycarboxylic acid alone.

(3) The compound of the present invention is a co-polymer of an oxycarboxylic acid and maleamic acid with each of the components influencing the other, and is different from a mixture of a homopolymer of the oxycarboxylic acid and a homopolymer of the maleamic acid. This difference in structure and composition has been confirmed by $^{13}C$—NMR analysis.

(4) The polymer thus obtained has properties which are different from those of a mixture of an aliphatic polyester and a polyamino acid, and is effective in preventing silica-type scale.

DETAILED DESCRIPTION OF THE INVENTION

The present invention is explained in greater detail below.

The oxycarboxylic acid for use in the present invention comprises an oxycarboxylic acid having a melting point of 170° C. or less, or a mixture thereof, or a mixture of at least one oxycarboxylic acid having a melting point of 170° C. or less and other oxycarboxylic acids having a melting point of more than 170° C.

The oxycarboxylic acid having a melting point of 170° C. or less includes, for example, malic acid, citric acid, tartaric acid, etc.

In the present invention, it is sufficient that one of the oxycarboxylic acids has a melting point of 170° C. or less. Those having a lower melting point are preferred because the temperature at the beginning of the reaction can be further lowered. Thus, malic acid and/or citric acid are preferred. Malic acid is more preferred because it melts at 133° C. or less.

The present invention employs at least one oxycarboxylic acid having a melting point of 170° C. or less because decomposition of maleamic acid is inhibited by making the oxycarboxylic acid, the melting point of which is lower than the maleamic acid, into a nearly molten state from the beginning of the reaction, and because the polymerization can proceed at a proper rate.

The maleamic acid for use in the present invention includes maleamic acid obtained by the reaction of maleic acid anhydride and ammonia. However, it does not matter if the reaction product contains the ammonium salt of maleic acid as an impurity.

The oxycarboxylic acid is used in an amount of 5/95 (wt/wt) or more based on the amount of maleamic acid. In case of a weight ratio of 90/10 or more (oxycarboxylic acid to maleamic acid), the effects of the invention are not obtained. In case of a weight ratio of less than 5/95, the system exhibits almost the same behavior as maleamic acid alone. That is, the polymerization reaction is difficult to carry out. For example, solidification occurs at the time of polymerization, and the properties of the polymer thus obtained are the same as those of a polymer of maleamic acid alone.

In case of a weight ratio of 90/10 or more, the polymerization does not proceed well just as in the case of oxycarboxylic acid alone, and the performance of the polymer thus obtained is low. The more preferable range is a weight ratio (oxycarboxylic acid to maleamic acid) of from 7.5/92.5 to 70/30. The properties of the polymer obtained when the composition of the raw material is within the above-described range is different from those of a polymer of maleamic acid alone or those of a polymer of an oxycarboxylic acid alone, or a mixture thereof. That is, the water-soluble polymer of the present invention effectively inhibits the formation of silica scale, and its capacity for inhibiting calcium scale or magnesium scale is hardly influenced by the presence of silica.

A conventional maleic acid scale inhibitor and an acrylic acid scale inhibitor is not effective in controlling silica scale. Also, the presence of silica decreases the capacity to inhibit calcium scale or magnesium scale. Therefore, the polymer of the present invention has been shown to function as an excellent scale inhibitor.

The polymerization reaction can be conducted using a conventional apparatus for carrying out a molten polymerization reaction. As such, a surface-renewal type apparatus which accommodates a high viscosity charge is preferred. That is, an agitating blade such as a helical type blade, an anchor type blade and a ribbon-blade type blade, etc., is appropriately used in a conventional rotation agitator. A special type of polymerizer comprising a single axial or a biaxial horizontal agitating polymerizer can also be used.

The method of supplying raw materials to the polymerizer is not particularly limited. Preferably, maleamic acid is slowly added to a molten oxycarboxylic acid to thereby constantly maintain a molten state.

The reaction is preferably conducted under an atmosphere of an inert gas, such as nitrogen or under vacuum. However, the reaction atmosphere is not limited if water produced in the reaction is removed at an appropriate rate.

The reaction can be monitored by measuring the amount of water that is generated in the reaction or by measuring the change in viscosity.

The reaction temperature at the start of the reaction is in the range of 170° C. or less, preferably 155° C. or less, and once the reaction proceeds to some extent, the temperature may be increased. This is because unreacted maleamic acid is readily decomposed at the start of the reaction. However, after the middle period of the reaction the temperature can be increased to reduce the viscosity and increase the reaction rate.

The polymer thus obtained is water-insoluble, but in alkaline water it is readily hydrolyzed to a water-soluble polymer.

The hydrolysis for use in the present invention is conducted, for example, by dissolving the polymer in an aqueous solution of sodium hydroxide and heating.

The aqueous solution of the polymer may be used as a scale inhibitor as such. Furthermore, although the hydrolyzed polymer is in the form of a salt, it may also be converted to and used in carboxyl group form by treating with an acid in a manner well known to those of ordinary skill.

The present invention is illustrated in greater detail below by reference to the following Examples. However, the present invention is not to be construed as being limited thereto.

EXAMPLES

Preparation Example 1

Into a 5 L reactor having an agitator, a fractional distillation condenser, a thermal indicator and a gas inlet were charged 400 g of malic acid and 2,800 g of maleamic acid. These ingredients were reacted at 135° C. for three hours under a nitrogen atmosphere. 450 g of water was removed by distillation between the start of the reaction and the end of the reaction, and about 2,700 g of a high viscosity product was obtained.

400 g of the reaction product was hydrolyzed by dissolving in an aqueous solution of NaOH to a total amount of 1,000 g at a pH of from 8.6 to 8.8, and heating to a temperature of from 60° C. to 80° C.

GPC (Gel Permeation Chromatography, SHIMAZU RID-6A (RI), Shodex SB-802.5 HQ, SB-803 HQ) analysis showed that organic low molecular weight substances having a weight-average molecular weight of 1,000 or less were not present in the aqueous hydrolysis solution, and the product had 4,000.

The weight-average molecular weight was determined based on standard polyethyleneglycol.

The NMR (NIHON DENSI Co., LTD, JEOL EX-270 (270 MHz)) data obtained was as follows:

$^{13}$C—NMR (270 MHz, $D_2O$) $\delta_{ppm}$: 37.0≈45.1, 52.8≈56.9, 71.8≈72.5 133.1≈140, 172.8≈184.0

Preparation Example 2

Into a bench kneader were charged 100 g of malic acid and 700 g of maleamic acid, and the reactants were heated to 135° C. under a nitrogen atmosphere. The reactants immediately melted. The temperature was then elevated to 150° C. for 1.5 hours and the reaction was stopped. 115 g of water was removed by distillation, and 680 g of a high viscosity product was obtained.

The weight-average molecular weight of the product was 5,500, and was determined in the same way as in Preparation Example 1.

The NMR data: $^{13}C$—NMR (270 MHz, $D_2O$) $\delta_{ppm}$: 40.1≈45.5, 54≈56.9, 72.0≈73.0, 133.0≈140.5, 174.1≈183.9

Preparation Example 3

The same procedures were carried out as in Preparation Example 2, except that 400 g of malic acid and 400 g of maleamic acid were charged to the kneader.

An aqueous solution of a polymer having a weight-average molecular weight of 3,300 was thus obtained.

The NMR data: $^{13}C$—NMR (270 MHz, $D_2O$) $\delta_{ppm}$: 40.0≈45.0, 54.6≈57.1, 71.8≈72.9, 133.1≈140.9, 174.6≈183.5

Preparation Example 4

The same procedures were carried out as in Preparation Example 1, except that citric acid was used in place of malic acid and the reaction temperature was 155° C.

An aqueous solution of a polymer having a weight-average molecular weight of 4,200 was thus obtained.

The NMR data: $^{13}C$—NMR (270 MHz, $D_2O$) $\delta_{ppm}$: 33.9≈47.8, 52.6≈56.7, 71.8≈72.3, 133.1≈140.0, 173.7≈184.5

Preparation Example 5

The same procedures were carried out as in Preparation Example 1, except that tartaric acid was used in place of malic acid and the reaction temperature was 170° C.

An aqueous solution of a polymer having a weight-average molecular weight of 4,000 was thus obtained.

Preparation Example 6

The same procedures were carried out as in Preparation Example 2, except that 400 g of malic acid, 300 g of citric acid and 200 g of maleamic acid were used.

An aqueous solution of a polymer having a weight-average molecular weight of 2,900 was thus obtained.

Example 1

The effectiveness of the aqueous solutions of the polymer prepared as described above was evaluated in a scale adhesion prevention test. The test was conducted using water which was formulated to correspond to cooling water running at high concentration in a cooling water system.

Test Liquid

Using the reagents calcium chloride ($CaCl_2.2H_2O$), magnesium sulfate ($MgSO_4.7H_2O$) and sodium methasilicate ($Na_2SiO_3·9H_2O$), a test liquid was prepared to provide a calcium hardness of 280 ppm, a magnesium hardness of 280 ppm, a M alkaline strength of 600 ppm and containing 350 ppm of silica.

Scale Adhesion Prevention Test

Into a beaker was charged 3 liters of the test liquid containing a polymer in a concentration of 10 ppm, and the contents were stirred with a magnetic stirrer. A 300 watts pipe heater made of copper (having a heat transfer area of 14.4 $cm^2$) was immersed into the test liquid, and a scale was separated out on the surface of the heater.

The temperature of the test liquid in the beaker was maintained at 35° C. by cooling water.

The test liquid was supplied into the beaker and overflowed at a rate of 1 liter/hr., and each test was carried out for 5 hours.

The scale which adhered onto the heater was immersed into a 5% hydrochloric acid solution, and the soluble content was analyzed to determine the calcium scale content. The insoluble content was scraped off and weighed to determine the silica scale content, and calculated in an amount of adhesion per 100 $cm^2$ to arrive at a scale adhesion prevention ratio (inhibition rate).

$$\text{scale adhesion prevention ratio (\%)} = \frac{X - Y}{X} \times 100$$

where X is the amount of adhesion (g/100 $cm^2$) when no polymer is added, and Y is the amount of adhesion (g/100 $cm^2$) when the polymer is added.

The results of the scale adhesion prevention test using the polymers of Preparation Examples 1 to 6 are shown in Table 1. These results show that the water-soluble polymer of the present invention is highly effective in preventing both calcium and silica scale.

TABLE 1

| Addition Polymer | Calcium Scale | | Silica Scale | |
|---|---|---|---|---|
| | Adhesion (g/100 $cm^2$) | Inhibition Rate (%) | Adhesion (g/100 $cm^2$) | Inhibition Rate (%) |
| none | 4.68 | 0 | 0.75 | 0 |
| Preparation Example 1 | 0.62 | 87 | 0.04 | 95 |
| Preparation Example 2 | 0.52 | 89 | 0.02 | 97 |
| Preparation Example 3 | 0.65 | 86 | 0.03 | 96 |
| Preparation Example 4 | 0.72 | 85 | 0.02 | 97 |
| Preparation Example 5 | 0.76 | 84 | 0.03 | 98 |
| Preparation Example 6 | 0.79 | 83 | 0.01 | 99 |

Example 2

Using sludge sampled from three points in Ibaraki Prefecture, Japan using a method conforming to MITI standards (Ryuichi Sudoh, KANKYO BISEIBUTSU JIKKENHO, 234, Kodansha, Scientific (1988)), the biodegradability of the polymers of Preparation Examples 1 to 6 was evaluated.

The decomposition rates for 28 days are shown in Table 2 below. Each of the polymers exhibited a high decomposition rate.

TABLE 2

| | Preparation Examples | | | | | |
|---|---|---|---|---|---|---|
| Polymer | 1 | 2 | 3 | 4 | 5 | 6 |
| Biodegradation Rate (%) | 85 | 82 | 87 | 84 | 83 | 90 |

Comparative Example 1

Scale adhesion prevention tests of conventional scale inhibitors, maleic acid polymer (Belclene 200, FMC) and acrylic acid polymer (Aqualic DL-40, NIPPON SHOKUBAI Co., LTD), were conducted following the procedures of Example 1. The results are shown in Table 3 below. Both scale inhibitors were rather effective against calcium scale, but were inadequate in inhibiting silica scale.

TABLE 3

| Scale Inhibitor | Calcium Scale | | Silica Scale | |
|---|---|---|---|---|
| | Adhesion (g/100 cm$^2$) | Inhibition Scale (%) | Adhesion (g/100 cm$^2$) | Inhibition Scale (%) |
| none | 4.68 | 0 | 0.75 | 0 |
| Maleic Acid Series | 1.95 | 58.3 | 0.48 | 36.0 |
| Acrylic Acid Series | 2.13 | 54.5 | 0.94 | 28 |

Comparative Example 2

The biodegradability of the scale adhesion inhibitors used in Comparative Example 1 was evaluated following the procedure of Example 2. As a result, the decomposition rate of the maleic acid scale inhibitor was found to be 2%, and the decomposition rate of the acrylic acid scale inhibitor was found to be 1%. These are very low decomposition rates.

Comparative Example 3

The same reactions were conducted using 800 g of malic acid alone as in Preparation Example 2. The polymer thus obtained was a low molecular weight substance having a Mw=1,200.

Furthermore, scale adhesion prevention tests were carried out following the procedures of Example 1. As a result, the same effects were obtained as in the case of non-addition of the polymer and no scale inhibiting function was observed.

Comparative Example 4

The same reactions were conducted using 800 g of malic acid and 70 g of maleamic acid as in Preparation Example 2. The results were the same as in Comparative Example 3.

Comparative Example 5

The same reactions were conducted using 3,200 g of maleamic acid alone as in Preparation Example 1. At first, agitation was conducted in a powdery state. Then, part of the mixture changed to a molten state and solidification was observed. At that point the mixture could no longer be agitated.

Comparative Example 6

800 g of maleamic acid alone was charged into a bench kneader and heated to 135° C. under a nitrogen atmosphere. With time the maleamic acid changed from a powder to a semi-molten state and then to a molten state. Once molten, the temperature was elevated to 150° C.

One hour after the temperature was increased, solidification was observed and the contents became difficult to agitate. The reaction was thus stopped.

The product was hydrolyzed following the procedure of Preparation Example 1 and analyzed by GPC. It was found that polymerization proceeded to 4,500.

Then, a scale adhesion prevention test of the polymer was conducted following the procedure of Example 1. The result was rather good, i.e., the adhesion amount of calcium was 1.20 g/100 cm$^2$, and the inhibition rate of calcium scale was 74%. However, the results were poor with respect to silica scale, i.e., the adhesion amount of silica was 0.40 g/100 cm$^2$, and the inhibition rate of silica scale was 47%.

Comparative Example 7

The polymer of the Comparative Example 6 and the polymer of the Comparative Example 3 were simply mixed in a weight ratio of 7:1.

The adhesion amount of calcium was 1.30 g/100 cm$^2$, and the inhibition rate of calcium scale was 72%. The adhesion amount of silica was 0.50 g/100 cm$^2$, and the inhibition rate of silica scale was 33%.

While the invention has been described in detail and with reference to specific embodiments thereof, it will be apparent to one skilled in the art that various changes and modifications can be made therein without departing from the spirit and scope thereof.

What is claimed is:

1. A water-soluble polymer prepared by: melting and reacting a mixture of an oxycarboxylic acid having a melting point of 170° C. or less and maleamic acid, or a mixture of a plurality of oxycarboxylic acids including at least one oxycarboxylic acid having a melting point of 170° C. or less and maleamic acid, at a temperature of 170° C. or less at the start of the reaction to obtain a polymer; and then hydrolyzing the polymer.

2. The polymer according to claim 1, wherein the oxycarboxylic acid having a melting point of 170° C. or less is selected from the group consisting of malic acid, citric acid and tartaric acid.

3. The polymer according to claim 1, wherein the oxycarboxylic acid has a melting point of 140° C. or less.

4. The polymer according to claim 1, wherein the weight ratio of the oxycarboxylic acid to the maleamic acid is in the range of from 5/95 (wt/wt) to 90/10 (wt/wt).

5. The polymer according to claim 1, wherein the weight ratio of the oxycarboxylic acid to the maleamic acid is in the range of from 7.5/92.5 (wt/wt) to 70/30 (wt/wt).

6. A method for preventing scale formation which comprises adding the polymer of claim 1 to a cooling water system, or to a process for making fresh water from sea water, or to a process for desalting salt water.

7. The polymer according to claim 1, wherein the polymer is a random co-polymer having a weight-average molecular weight of 2,000 to 20,000 and comprising a structural unit selected from those represented by formulae I, II, III and IV:

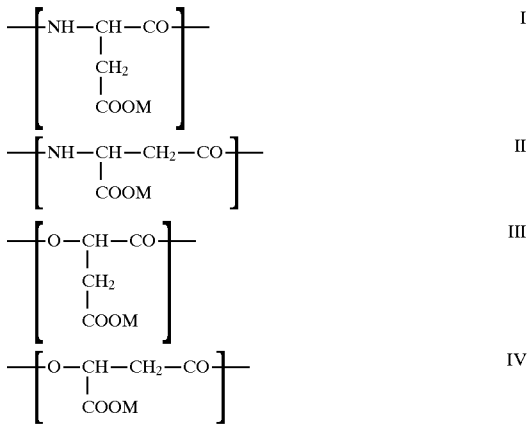

where M is H, K, Na or NH$_4$.

8. A method for preparing a water-soluble polymer which comprises melting and reacting a mixture of an oxycarboxylic acid having a melting point of 170° C. or less and maleamic acid, or a mixture of a plurality of oxycarboxylic acids including at least one oxycarboxylic acid having a melting point of 170° C. or less and maleamic acid, at a temperature of 170° C. or less at the start of the reaction to obtain a polymer; and then hydrolyzing the polymer.

9. The method according to claim 8, wherein the oxycarboxylic acid having a melting point of 170° C. or less is selected from the group consisting of malic acid, citric acid and tartaric acid.

10. The method according to claim 8, wherein the oxycarboxylic acid has a melting point of 140° C. or less.

11. The method according to claim 8, wherein the weight ratio of oxycarboxylic acid to maleamic acid is in the range of from 5/95 (wt/wt) to 90/10 (wt/wt).

12. The method according to claim 8, wherein the weight ratio of oxycarboxylic acid to maleamic acid is in the range of from 7.5/92.5 (wt/wt) to 70/30 (wt/wt).

13. The method according to claim 8, wherein the polymer is a random co-polymer having a molecular weight of 2,000 to 20,000 and comprising a structural unit selected from those represented by formulae I, II, III and IV:

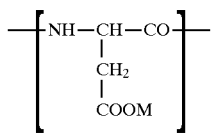   I

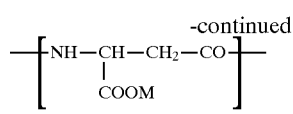   II

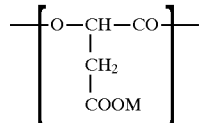   III

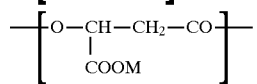   IV where M is H, K, Na or $NH_4$.

14. The method according to claim 8, wherein said hydrolyzing comprises dissolving the polymer in an aqueous alkaline solution.

* * * * *